July 8, 1969 V. F. THOMPSON 3,454,036
CARBURETOR FUEL INLET VALVE

Filed Sept. 8, 1966 Sheet 1 of 3

INVENTOR
Vernon F. Thompson

INVENTOR
Vernon F. Thompson

INVENTOR
Vernon F. Thompson

United States Patent Office 3,454,036
Patented July 8, 1969

3,454,036
CARBURETOR FUEL INLET VALVE
Vernon F. Thompson, Crestwood, Mo.
(10460 German Road, St. Louis, Mo. 63131)
Filed Sept. 8, 1966, Ser. No. 578,043
Int. Cl. F16k 1/36, 3/18
U.S. Cl. 137—329.04                3 Claims

ABSTRACT OF THE DISCLOSURE

A preassembled unitary carburetor valve mechanism with a hollow body, a floating disc-type valve, an actuator with an enlarged head bearing upon the valve and a stem projecting from one end of the hollow body, a closure with an opening through it to accommodate the stem of the actuator, and means for mounting the preassembled unitary valve mechanism in a carburetor reservoir. The valve seat and closure are fixedly mounted with respect to one another and the disc and actuator head are caged within the hollow body between the valve seat and the closure.

---

This invention relates to improvements in valves for carburetors of the kind ordinarily operated by a buoyant device or by fluid pressure responsive member such as a piston or diaphragm and customarily installed in a carburetor for the purpose of maintaining a substantially constant fuel level (head of liquid fuel) as a fuel supply for the fuel metering devices in a carburetor. In the above respects, this invention is an improved form of the valve shown in my prior application for patent Ser. No. 246,653 filed Dec. 17, 1962 now Patent No. 3,334,649 entitled: Carburetor Float Valve.

As will be readily recognized from the accompanying drawings and detailed description, this improved form (or forms) of the valve has similar parts, constructed of the same materials, operating in the same manner for the same purposes, to obtain the same favorable results as described at length by my prior application for patent. It is my intent, therefore, to incorporate by reference into this description these pertinent parts of my above identified application for patent. With the above reference as background, the terms used here will need no further explanation.

According to this invention, what is referred to as a cage, or body, and as an operating plunger for the valve have been modified in several respects to obtain: A more compact and versatile valve with enhanced compatibility to changing environment, to extend the scope of its adaptability as a replacement for valves in original equipment carburetors.

The valve body has improved pressure relief and is readily adaptable to production technics in manufacture. The operating plunger for use in the valve body requires less guiding surfaces for satisfactory operation to carry out the object of more compact size.

By way of explanation, the valve disclosed in my prior application has a body with an internal cylindrical barrel which acts as a guide for the plunger element of polygonal, round, or triangular cross-section having a sliding fit in the barrel. Even though vent holes were provided in the barrel, fluid pressures acting on the substantial cross-section of the plunger were discovered to resist the opposing valve closing forces on the plunger to an extent affecting valve action. Such valve retarding forces on valve closing action are undesirable in certain installations. In others they appear to have no appreciable adverse affect at all, or none which can be detected.

To extend valve compatibility this improved valve has two distinctly new elements, a different body and a different plunger. The plunger is of the same shape as a round head rivet with the stem of the rivet acting as guide for the round head which contacts the valve.

The body has been modified to provide a guiding surface for the stem of the rivet-like plunger. Since both stem and guide are small in diameter, comparatively speaking, fuel discharge between them is reduced so that more nearly balanced fluid pressures will exist on opposite sides of the head of the rivet shaped plunger and adjacent valve faces. This minimizes the influence of fluid pressures on valve closing action.

As a secondary benefit, the same ratio of length to diameter of the stem as used in the former plunger can be obtained in less than half the length to obtain a more compact valve.

As a third benefit, the valve becomes a unitary structure in which valve travel can be preset exactly.

The body has also been modified to locate the vent or relief holes so that their relief action is more effective even on initial valve opening, and their discharge direction, location, and energy is less disturbing to valve action and carburetor operation.

This compact valve has many new uses, two examples of which will be described. In one the small size permits its use as a replacement. In the other, its small size permits the location of the vent or relief holes above normal fuel level in a carburetor fuel bowl and permits passage of gases and liquids without interference with valve closing action. These new uses are shown by the illustrations in the accompanying drawings which are exemplary:

Figure 1:
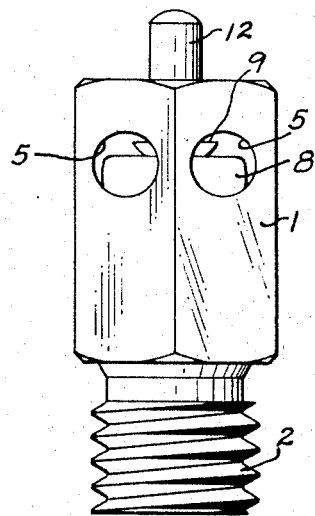
FIGURES 1 and 2 are vertical elevation and vertical sectional views, respectively illustrating this improved form of my original valve with plunger of modified form, and a two piece body including a cage and an apertured plug closure.
Figure 2:
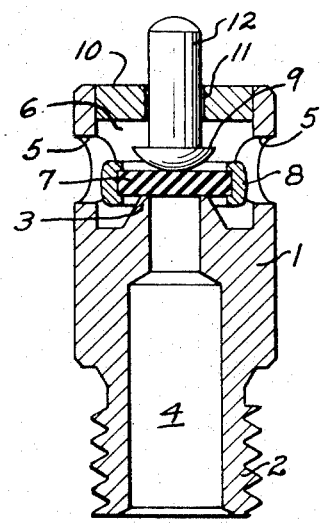

As illustrated in FIGURES 1 and 2 of the accompanying drawings the valve mechanism has a hollow body 1 with a threaded end 2. Integral with the body is a raised valve seat 3 around an inlet passage 4. The flats on the hexagonal body I have apertures 5 drilled therein to form outlets or vents for passage of fluid from chamber 6.

Within chamber 6 in a valve 7 of rubber-like flexible and resilient material fixed in a ring 8. Actuator means 9 has a convex surface engaging the valve 7 and on which the valve is free to rotate and rock. The structure so far described is the same as that shown in my above referred to patent application.

Chamber 6 is closed at one end by a plug 10 having an aperture 11 concentric with passage 4. The stem 12 of actuator means 9 is received slideably in aperture 11, and stem 12 and aperture 11 together form guiding means for the actuator 9. The inner surface of plug 10 determines actuator travel and forms means by which valve opening may be preset.

The hollow valve body 1 is customarily of brass but the plug 10 may be of metal or plastic as deemed appropriate.

The actuator means 9 and stem 11 may be of metal or plastic but if of plastic, care must be exercised to chose those unaffected by fuels over a wide range of temperatures. Plastics such as sold now under the trademark "Teflon" would be suitable.

Figure 3:
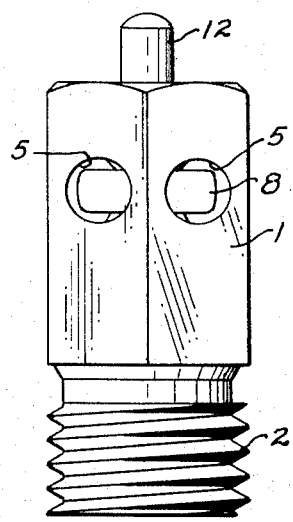
FIGURES 3 and 4 are vertical elevation and vertical sectional views of this same valve with plunger of modified form and a two piece body including a cage and valve seat.
Figure 4:
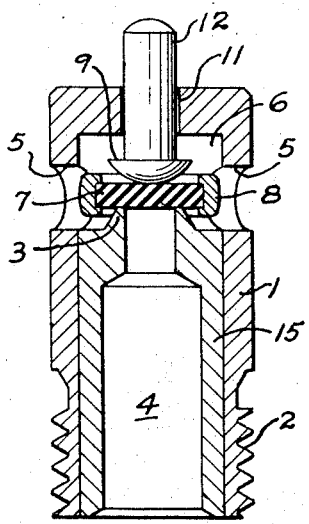

The valve mechanism shown in FIGURES 3 and 4 is similar to that above described. The same reference characters are used where applicable to indicate like parts and this description will be limited to the differences.

The valve body 1 is bored at one end to form aperture 11 and counter bored at its opposite end to form the hollow valve body with chamber 6. In this device the closure is a plug 15 containing inlet passage 4 and formed with valve set 3. The plug 15 is suitably secured in place in body 1. Since plug 15 does not have to be threaded it may be of light metal (aluminum) or plastic as seems expedient for a particular application.

Figure 5:
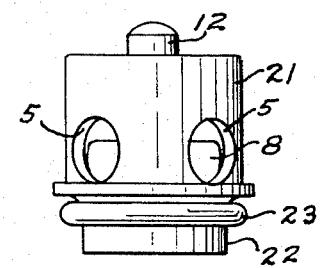
FIGURES 5 and 6 are vertical elevation and vertical sectional views of this valve with plunger of modified form and a three piece body including a cage, a valve seat and an apertured plug.
Figure 6:
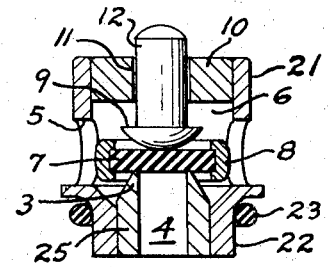

The valve mechanism shown in FIGS. 5 and 6 is similar to those above described. The same reference characters are used to indicate like parts. This description will be limited to the differences.

The valve body 1 is bored at one end to form aperture 11 and counter bored at its opposite end to form the hollow valve body with chamber 6. In this device the closure is a plug 15 containing inlet passage 4 and formed with valve seat 3. The plug 15 is suitably secured in place in body 1. Since plug 15 does not have to be threaded it may be of light metal (aluminum) or plastic as seems expedient for a particular application.

The valve mechanism shown in FIGURES 5 and 6 is similar to those above described. The same reference characters are used to indicate like parts. This description will be limited to the differences.

Figure 10:
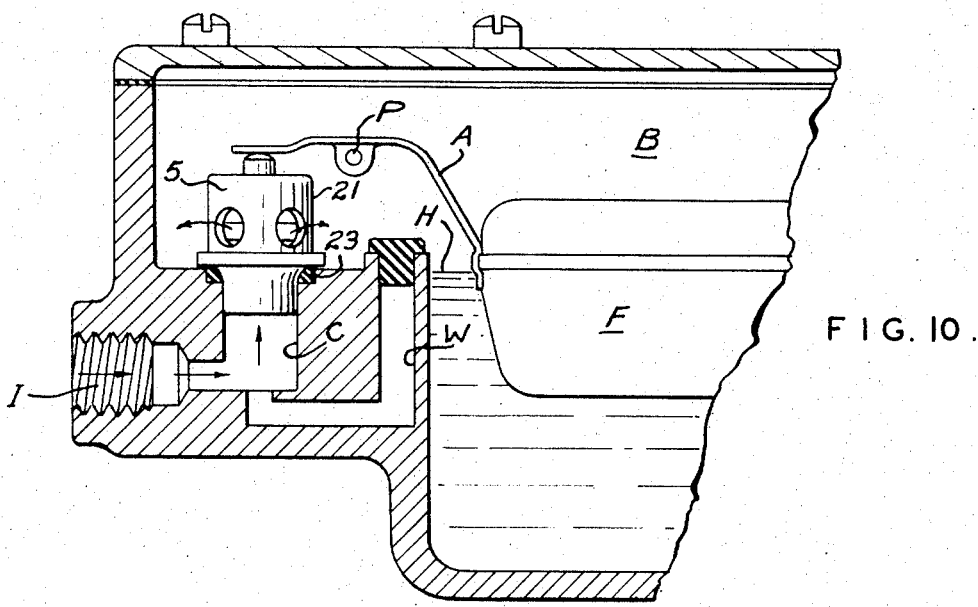

The hollow valve body 21 is cylindrical and has a tapered cylindrical end 22 of reduced section for a press fit in the fuel inlet of a carburetor body. A rubber O-ring 23 is the liquid seal as shown in the installation illustrated in FIGURE 10 hereinafter described.

The chamber 6 of the hollow valve body 21 is closed by a plug 10, the same as in FIGURE 2. A tube 25 with a chamfered end 3, forming the valve seat, is pressed into end 22.

Where the valve seat 3 is formed on a separate elements 15 or 25 as the case may be the fuel outlets 5 may be drilled in opposite sides by a single pass of a single drill to provide outlets or vents between a plane defined by the valve seat 3 and inlet end 2 or 22. Thus there is a production advantage to be gained in making the body in two pieces with one a seat plug 15 as in FIGURE 4 instead of a two piece body with plug 10 as in FIGURE 2. The three piece body in FIGURE 6 has its own advantages in that substitution during assembly may be made for any one of the three pieces. Model change is thereby simplified in this respect.

Figure 7:
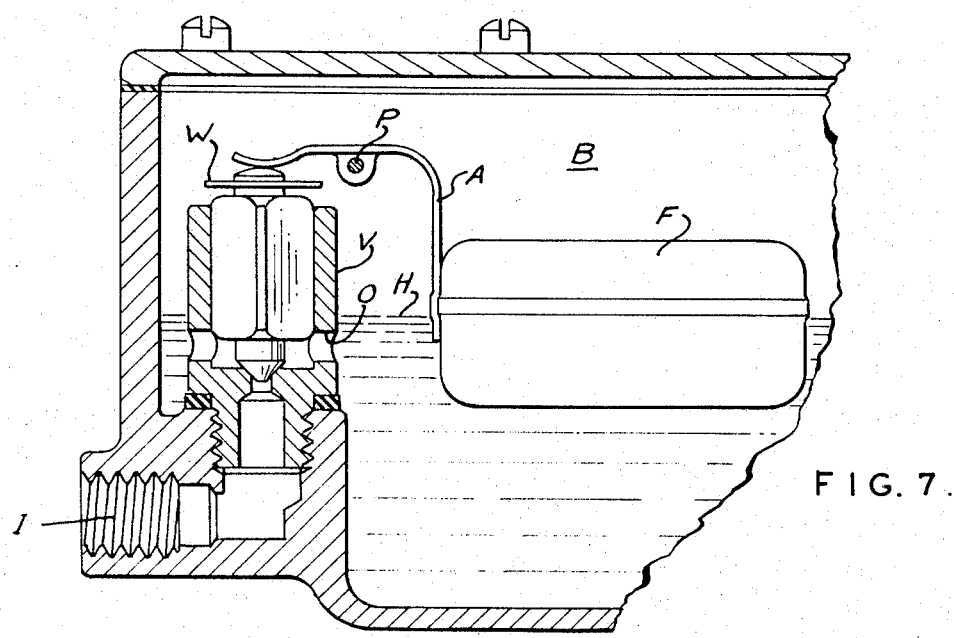
FIGURES 7 and 8 are fragmentary sectional views taken through a carburetor fuel bowl schematically illustrating the arrangement of a valve in the carburetor in an original equipment application (FIG. 7) and a similar view illustrating the replacement valve when installed (FIG. 8)

Turning now to FIGURE 7, the fuel reservoir B contains a float F on an arm A pivoted at P. One end of the arm bears against the valve element of a fuel inlet valve V of conventional construction. The fuel inlet I from the fuel pump is controlled by valve V in response to changes in the head of fuel H in the carburetor as sensed by float F. Outlets O are necessarily located below normal fuel level H.

As discussed in my prior application it is quite a normal occurrence to have vapor in the inlet I in the form of bubbles mixed with liquid fuel. The size of the bubbles of vapor vary with temperature under the hood and adjacent the engine. The amount of liquid varies inversely with the volume of vapor.

The pressure generated in this mixture of bubbles and liquid can readily exceed the rated delivery pressure of the fuel pump.

Under such conditions when valve V opens, the vapor expands and because escape is impeded by the presence of liquid above the outlets O, some will blow by the valve as well as out of outlets O. In all probability the designers added the washer W to act as a deflector in this installation. However effective it may be for this purpose, the washer does not neutralize or balance the effect of gas pressures acting in a direction to open valve V, nor, will the location of outlets O below fuel level neutralize entirely the disturbing action on the head H of fuel caused by the escape of gases, or, a mixture of liquid and gases under pressure. However because of the comparatively elongated form of valve V needed to obtain adequate guiding, it would be impossible to locate outlets O above the fuel liquid level H and still have them serve some useful purpose to relieve or vent gas pressures.

Figure 8:
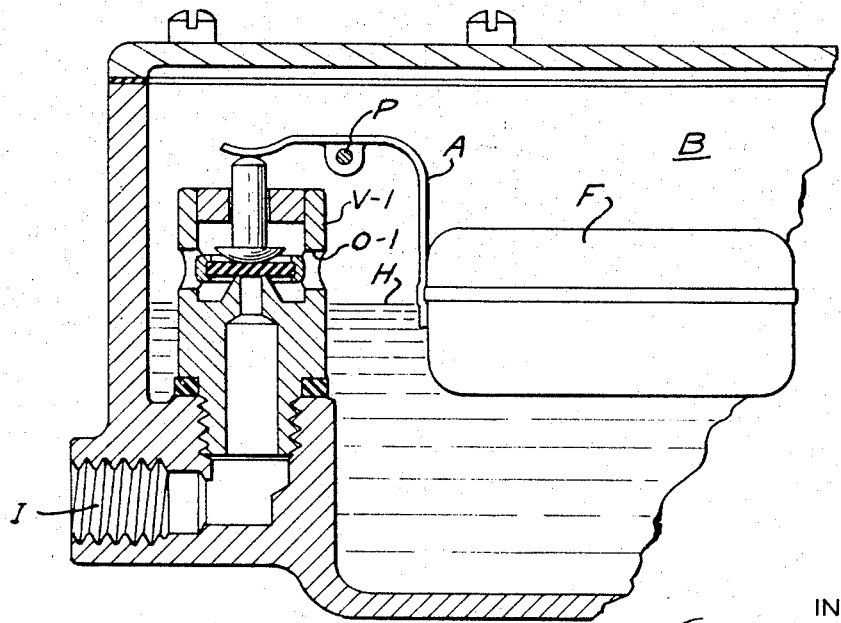

Comparing FIGURE 7 with FIGURE 8 the advantage of comparative compact size for replacement valve V-1 is apparent. Because of this compact form outlets O-1 can be located to open below the valve and still be above fuel level H. Even though due to sloshing of fuel in the carburetor some outlets O-1 are temporarily below fuel level, nevertheless, pressures above and below the valve and actuator will be nearly equal. Pressures in the valve chamber accordingly have little infence on the effectiveness of the valve. Equalization of the pressures which would affect valve action are due in part to shape of the actuator and stem as well as the small area between stem and guide. Consequently the drop in pressure below the valve occurring during the relief of pressure even though only a small area of the total provided by outlets O (when partially submerged) will be greater than any drop in pressure above the valve through the very small area provided between stem and guide. Thus pressure below the valve and actuator would tend to be less than those above.

Figure 9:
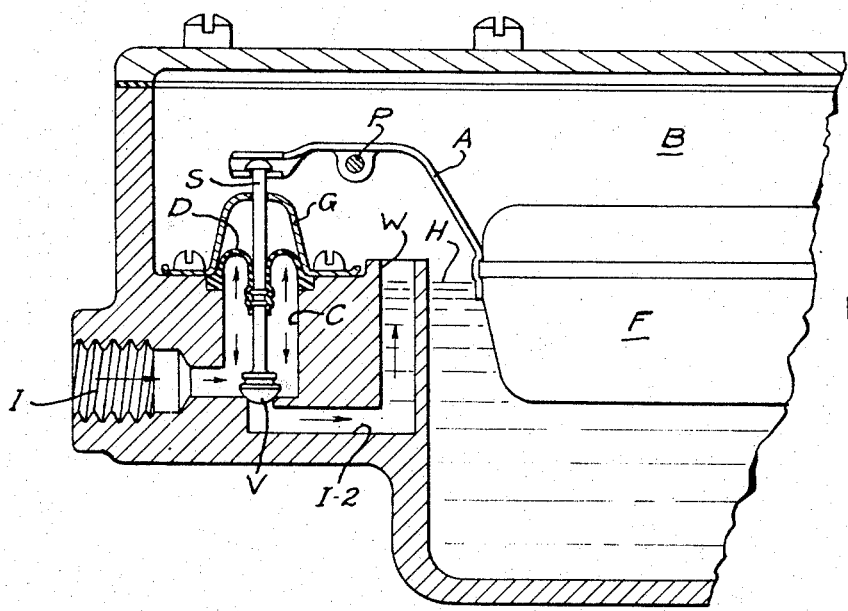
FIGURES 9 and 10 are views similar to FIGURES 7 and 8 schematically illustrating another arrangement of a valve in a carburetor of an original equipment application (FIG. 9) and the replacement valve installed (FIG. 10).

Turning now to FIGURE 9, the fuel reservoir B contains a float F mounted on an arm A pivoted at P. The fuel inlet passage 1 leads to a valve chamber C. The outlet from the chamber C has a valve seat at the entrance to a passage I-2 connected to vertical well W. The valve V has a seating face of rubber-like material and a stem S operated by arm A. The upper end of the stem S is guided by an aperture in clip G which also secures the outer periphery of diaphragm P in the open end of valve chamber C. The inner periphery of diaphragm D is sealed to stem S.

The pressures of liquid or liquid and gas at inlet I will have little affect upon valve V when closed. This is because, as the arrows indicate, the same pressures act on the diaphragm D in the valve opening direction as on valve V in a closing direction. If the areas are equal, the net forces tending to open or close valve V would be equal.

When valve V opens, the fluid passes through passage I-2 into well W which obviously is large enough to permit *some expansion* of any vapors present without blowing the liquid vertically from the well into the carburetor vents. However, such an occurrence is certainly possible.

Obviously, if diaphragm D leaks, replacement is necessary. Comparing the original of FIGURE 9 with the replacement of FIGURE 10 it is apparent that the compact size of the replacement valve shown in FIGURES 5 and 6 is a decided advantage since it can be used as a replacement without any alteration of the original carburetor body by simply pluging well W. This does not eliminate the function performed by the well since valve 21 has outlets 5 above fuel level H, and under no circumstances can the fuel be blown vertically by vapor pressures as is possible from the well.

The afore described balance of pressures inherent in valve 21 occur for the same reason as above explained about the replacement in FIGURE 8. This feature results in a valve action in response to float forces so similar to the original equipment in FIGURE 9 that the same control is maintained while fuel discharge, as compared with well W, is improved.

Having described examples of this improved valve by structure and application, what I claim and desire to secure by Letters Patent is:

1. In a carburetor having a fuel reservoir, a fuel inlet in said reservoir, a valve mechanism controlling said fuel inlet, and means responsive to the head of fuel in said reservoir for actuating the same, said valve mechanism having:

(a) A hollow valve body, (b) A passage in said valve body for forming a part of the fuel inlet in said fuel reservoir, (c) A valve seat around one end of said passage protruding into said hollow valve body, (d) A valve formed of a reversable plug of flexible, resilient rubber-like material with a diameter greater than said seat and relatively rigid means provided with an aperture in which said plug is held to limit flexing of said plug, (e) Actuator means including a member with a convex surface on which said plug is rockably supported relative to said seat, and with (f) Means in said valve body guiding movement of said actuator means in said valve body and said valve toward and away from said seat;

the improvement comprising a preassembled unitary valve mechanism consisting of said valve body, said valve, an actuator having an enlarged head section and a stem having a diameter smaller than the valve diameter, extending axially of the valve mechanism and projecting from the valve body at an end opposite the valve seat, a closure for said hollow body with an aperture concentric with said hollow body to slidably receive said stem and act as said guiding means for said actuator means, axially and radially of said hollow valve body, said closure forming with said hollow valve body a chamber, fluid outlets in said hollow valve body located radially outwardly with respect to said valve to relieve fluid pressures acting on said valve when open, said valve and actuator head section being caged between said closure and said valve seat, said valve seat and closure being fixed within the said hollow body with respect to one another before the valve mechanism is installed in said reservoir, and said closure forming a stop against which one of the said head section and valve abuts to limit the degree of movement of the valve away from said seat, and mounting means cooperating with mounting means on said reservoir for mounting said preassembled mounting mechanism in said reservoir.

2. The improved valve mechanism as defined in claim 1 in which said closure is an apertured plug element secured in an open end of said hollow valve body.

3. The improved valve mechanism as defined in claim 1 in which said inlet passage and valve seat are formed in a plug element secured in said hollow valve body.

References Cited

UNITED STATES PATENTS

| | | | |
|---|---|---|---|
| 1,639,997 | 8/1927 | Haas | 137—444 X |
| 2,679,863 | 6/1954 | Tucker | 137—451 X |
| 2,774,520 | 12/1956 | Laundry. | |
| 2,869,578 | 1/1959 | Crockett | 137—444 |
| 3,051,193 | 8/1962 | Griffen | 137—451 X |
| 3,334,649 | 8/1967 | Thompson | 137—329.04 |

WILLIAM F. O'DEA, *Primary Examiner.*

D. R. MATTHEWS, *Assistant Examiner.*

U.S. Cl. X.R.

137—444, 451, 454.5